J. Smith,
Exhaust Mechanism for Steam Engines.
Nº 67,364. Patented July 30, 1867.
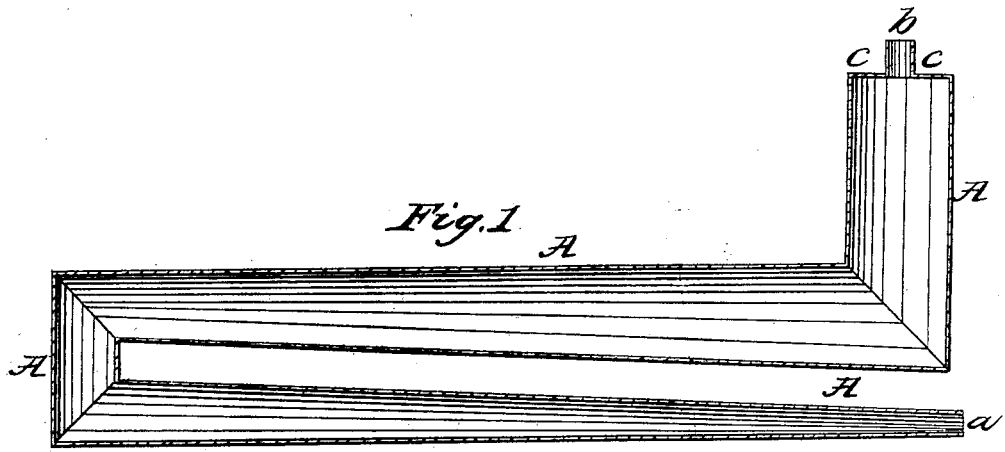
Witnesses:
Inventor:
Joseph Smith,
By atty A. B. Stoughton.

United States Patent Office.

JOSEPH SMITH, OF PHILADELPHIA, PENNSYLVANIA.

Letters Patent No. 67,364, dated July 30, 1867.

IMPROVED ESCAPE PIPE FOR STEAM ENGINES.

*The Schedule referred to in these Letters Patent and making part of the same.*

TO ALL WHOM IT MAY CONCERN:

Be it known that I, JOSEPH SMITH, of the city and county of Philadelphia, and State of Pennsylvania, have invented a new and useful improvement in Escape Pipes for High-Pressure Engines, by which the noise of the escaping steam is smothered and avoided; and I do hereby declare the following to be a full, clear, and exact description of the same, reference being had to the accompanying drawing, in which—

Figure 1 represents a section through one of the escape pipes in question, which I have found to answer the purpose well in practice.

The drumming noise of escaping steam from non-condensing engines, in cities more particularly, is very annoying, and in cities it is quite dangerous in frightening horses.

The object of my invention is to muffle escaping steam, and thus prevent the noise that proceeds from all high-pressure engines, locomotive or stationary; and my invention consists in using an escape pipe, the inlet and exit area of which shall be of the same, or nearly the same size, and between these two points expanding or increasing the area of said pipe, so that the steam can expand, cushion, and condense partially therein, before it reaches the exit.

To enable others skilled in the art to make and use my invention, I will proceed to describe the same with reference to the drawing.

In stationary engines, and where sufficient height is easily attainable, I propose to use a vertical escape pipe; but where such space cannot be had, I make them as shown in the drawings, and in form of a rectangular or spiral coil. In street engines the escape pipe may have horizontal and vertical joints or sections.

A represents an escape pipe, the area of whose inlet $a$ and exit $b$ is about the same, whilst the pipe itself increases in area from $a$ to near $b$, where a head, $c$, is put in, and the escape-opening $b$ made of about uniform area with the inlet $a$. The steam having an opportunity of expanding in the escape pipe, it will pass out at $b$ without noise. It is not necessary that the pipe should expand regularly from its inlet to its exit. It is only necessary that there should be a passage, chamber, or way between the inlet and the exit, that the steam can expand in, which checks its force and prevents the noisy escape of high-pressure engines. The water of condensation in the pipe may be drawn off in any well-known way, and carried back to the boiler or tank.

Having thus fully described my invention, what I claim therein as new, and desire to secure by Letters Patent, is—

A steam-escape pipe for high-pressure engines, (locomotive or stationary,) whose inlet and exit openings shall be of uniform, or nearly so, areas, and of much less area than a portion at or near the exit thereof, so that the steam can expand, lose its force, and become muffled, before its escape into the air, substantially as and for the purpose described.

JOSEPH SMITH.

Witnesses:
    A. B. STOUGHTON,
    EDM. F. BROWN.